(12) United States Patent
Liu et al.

(10) Patent No.: US 11,111,864 B2
(45) Date of Patent: Sep. 7, 2021

(54) INTAKE OXYGEN CONCENTRATION CONTROL SYSTEM SUITABLE FOR ENGINE WITH LEAN NOX TRAPPING TECHNOLOGY

(71) Applicant: Tianjin University, Tianjin (CN)

(72) Inventors: Haifeng Liu, Tianjin (CN); Can Wang, Tianjin (CN); Mingchao Liu, Tianjin (CN); Mingfa Yao, Tianjin (CN); Zunqing Zheng, Tianjin (CN); Hu Wang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 17/078,360

(22) Filed: Oct. 23, 2020

(65) Prior Publication Data

US 2021/0123388 A1 Apr. 29, 2021

(30) Foreign Application Priority Data

Oct. 25, 2019 (CN) .......................... 201911022884.X

(51) Int. Cl.
*F02D 41/00* (2006.01)
*F01N 3/10* (2006.01)
(Continued)

(52) U.S. Cl.
CPC ........... *F02D 41/0002* (2013.01); *F01N 3/10* (2013.01); *F01N 11/007* (2013.01); *F02C 3/02* (2013.01);
(Continued)

(58) Field of Classification Search
CPC ............. F02D 41/0002; F02D 41/1454; F02D 41/008; F02D 41/0275; F02D 41/0235;
(Continued)

(56) References Cited

U.S. PATENT DOCUMENTS

| 5,649,517 | A | * | 7/1997 | Poola | ..................... | B01D 53/22 |
| | | | | | | 123/585 |
| 6,516,787 | B1 | * | 2/2003 | Dutart | .................... | F02M 25/12 |
| | | | | | | 123/539 |

(Continued)

*Primary Examiner* — Audrey B. Walter
*Assistant Examiner* — Dapinder Singh
(74) *Attorney, Agent, or Firm* — Renner, Otto, Boisselle & Sklar, LLP

(57) ABSTRACT

The present disclosure discloses an intake oxygen concentration control system suitable for an engine with lean $NO_x$ trapping technology. The system adopts an exhaust turbocharging device to provide a pressure difference for an oxygen-enriched membrane to generate oxygen-rich and oxygen-deficient gases, and controls the intake oxygen concentration of different cylinders by adjusting the opening of flow control valves to match lean and rich combustion cycles of a lean $NO_x$ trapping system. In a lean combustion cycle, all four cylinders are filled with an oxygen-rich gas, which can make the combustion more complete and improve the thermal efficiency and fuel economy. In a rich combustion cycle, one of the four cylinders is filled with an oxygen-deficient gas, and the other three cylinders are filled with air or an oxygen-rich gas with a low concentration, so that less fuel is required to create a reducing atmosphere to realize the release and reduction of $NO_x$ in a lean $NO_x$ trapping device, thereby reducing the fuel consumption and ensuring the output power of the other three cylinders.

1 Claim, 1 Drawing Sheet

(51) Int. Cl.
*F01N 11/00* (2006.01)
*F02C 3/02* (2006.01)
*F02D 41/14* (2006.01)
*F02M 35/02* (2006.01)
*F02M 35/024* (2006.01)
*F02M 35/10* (2006.01)
*F02M 35/104* (2006.01)

(52) U.S. Cl.
CPC ....... *F02D 41/1454* (2013.01); *F02M 35/024* (2013.01); *F02M 35/104* (2013.01); *F02M 35/10157* (2013.01)

(58) Field of Classification Search
CPC ...... F02D 41/0082; F02D 19/12; F02D 21/02; F01N 3/10; F01N 3/0842; F01N 3/0814; F01N 11/007; F01N 2560/025; F02C 3/02; F02M 35/024; F02M 35/10157; F02M 35/104; F02M 35/10; F02M 25/12; F02M 27/00; B01D 53/22; F02B 47/06
See application file for complete search history.

(56) References Cited

U.S. PATENT DOCUMENTS

| | | | | |
|---|---|---|---|---|
| 7,337,770 | B2 * | 3/2008 | Moon | F02D 19/12 |
| | | | | 123/585 |
| 7,377,272 | B2 * | 5/2008 | Davidson | B01D 63/02 |
| | | | | 123/585 |
| 8,177,885 | B2 * | 5/2012 | Wijmans | B01D 53/62 |
| | | | | 95/51 |
| 9,074,559 | B2 * | 7/2015 | Nemitallah | F02M 25/06 |
| 2019/0242338 | A1 * | 8/2019 | Habib | F01N 5/02 |

\* cited by examiner

INTAKE OXYGEN CONCENTRATION CONTROL SYSTEM SUITABLE FOR ENGINE WITH LEAN NOX TRAPPING TECHNOLOGY

TECHNICAL FIELD

The present disclosure relates to the field of engines, and in particular to an intake oxygen concentration control system suitable for an engine with lean $NO_x$ trapping technology.

BACKGROUND

The development of engines is facing huge challenges from emission regulations and $CO_2$ regulations, and more efficient and cleaner engines are required. An engine converts thermal energy into mechanical energy through the combustion of fuel in a cylinder to output power. Further improvement of the thermal efficiency of an engine will lead to increase of the temperature in the cylinder, which provides the high-temperature condition required for $NO_x$ generation, resulting in the emission of a large amount of $NO_x$. $NO_x$ is harmful to human health and is one of the main factors leading to photochemical smog. Therefore, it is necessary to control $NO_x$ emissions while improving the thermal efficiency of an engine. Oxygen-enriched combustion can solve the problem of local oxygen-deficiency in traditional combustion, lead to more sufficient combustion of fuel, and increase the flame temperature and flame propagation speed, thereby improving the thermal efficiency and fuel economy. However, oxygen-enriching combustion will cause temperature rise in the cylinder and thus result in increase of $NO_x$ emissions. In addition, the nitrogen-rich gas in most engines with oxygen-enriched combustion cannot be effectively utilized.

The lean $NO_x$ trapping technology is an effective post-treatment technology to reduce $NO_x$ emissions. Oxidizing and reducing atmospheres are created for a lean $NO_x$ trapping device through periodic lean combustion and rich combustion in an engine. At the oxidizing atmosphere, $NO_x$ is stored as a nitrate or nitrite using a catalyst, and at the reducing atmosphere, $NO_x$ is released and reduced to harmless $N_2$, and then discharged. In a suitable temperature range, the lean $NO_x$ trapping technology can achieve a $NO_x$ removal rate as high as 95%, but more fuel needs to be injected to create reducing atmospheres, resulting in increased fuel consumption.

SUMMARY

The present disclosure is intended to overcome deficiencies of the oxygen-enriched combustion technology and lean $NO_x$ trapping technology, and provide an intake oxygen concentration control system suitable for an engine with lean $NO_x$ trapping technology. By controlling the intake oxygen concentration of different cylinders, in combination with the lean $NO_x$ trapping technology, the present disclosure can reduce $NO_x$ emissions from oxygen-enriched combustion and fuel consumption in the reduction reaction of the lean $NO_x$ trapping post-treatment system.

The objective of the present disclosure is achieved by the following technical solutions.

The present disclosure provides an intake oxygen concentration control system suitable for an engine with lean $NO_x$ trapping technology, including an exhaust turbocharging system, an intake system, a lean $NO_x$ trapping post-treatment system, and a control system.

The exhaust turbocharging system includes a turbine, and a revolving shaft of the turbine is fixedly connected with a revolving shaft of a compressor coaxially.

The intake system includes an air filter installed on an intake pipe, where, an inlet of the air filter communicates with the atmosphere, an intake pipe at an exhaust side of the air filter communicates with a gas inlet of the compressor, and a gas outlet of the compressor communicates with inlets of three branches; an outlet of a first branch is connected to a gas inlet of an oxygen-enriched membrane, and after air passes through the oxygen-enriched membrane, oxygen-rich and oxygen-deficient gases are generated; an oxygen-rich gas outlet of the oxygen-enriched membrane communicates with an oxygen-rich gas mixing chamber via an oxygen-rich gas branch, and an outlet of the oxygen-rich gas mixing chamber is connected to four cylinders via intake manifolds; a mixed gas flow control valve is disposed on an intake manifold communicating with a first cylinder on the left;

an oxygen-deficient gas outlet of the oxygen-enriched membrane is connected, via an oxygen-deficient gas branch, successively to an inlet of an oxygen-deficient gas exhaust pipe, an oxygen-deficient gas mixing chamber, and an intake manifold located at an outlet of the mixed gas flow control valve and communicating with the first cylinder on the left; an oxygen-deficient gas flow control valve is installed on the oxygen-deficient gas exhaust pipe;

a second branch is connected, along an air flow direction, successively to a first air flow control valve and an oxygen-deficient branch located between an gas inlet of the oxygen-deficient gas exhaust pipe and the oxygen-deficient gas mixing chamber; the air circulating in the second branch is mixed with the oxygen-deficient gas in the oxygen-deficient gas mixing chamber; a third branch is connected, along the air flow direction, successively to a gas inlet of an air exhaust pipe and the oxygen-rich gas branch located between the oxygen-rich gas mixing chamber and the oxygen-rich gas outlet of the oxygen-enriched membrane; a second air flow control valve is installed on the air exhaust pipe; and the air circulating in the third branch is mixed with the oxygen-rich gas in the oxygen-rich gas mixing chamber.

The lean $NO_x$ trapping post-treatment system includes an oxygen sensor and a lean $NO_x$ trapping device that are successively arranged on an engine exhaust pipe along a cylinder exhaust direction; and a gas inlet of the turbine communicates with an engine exhaust pipe, and a gas exhaust of the turbine communicates with the lean $NO_x$ trapping device.

The control system includes an electronic control unit (ECU) that is connected to the engine, the first air flow control valve, the second air flow control valve, the oxygen-deficient gas flow control valve, the mixed gas flow control valve, and the oxygen sensor via control lines, separately; and the ECU generates opening signals for each flow control valve according to the engine operating condition signals and oxygen concentration signals from the oxygen sensor.

Compared with the prior art, the present disclosure has the following beneficial effects.

In a lean combustion cycle (oxidation atmosphere) required for lean $NO_x$ trapping device, all four cylinders are filled with an oxygen-rich gas, which can make fuel combustion more complete and improve the thermal efficiency and fuel economy. Moreover, use of the lean $NO_x$ trapping post-treatment system avoids the problem that $NO_x$ emission is increased due to oxygen-enriched combustion.

In a rich combustion cycle (reducing atmosphere) required for lean $NO_x$ trapping device, one of the four cylinders is filled with an oxygen-deficient gas, and the other three cylinders are filled with air or an oxygen-rich gas with a low concentration, so that less fuel is required to create a reducing atmosphere to realize the release and reduction of $NO_x$, thereby reducing the fuel consumption and ensuring the output power of the other three cylinders.

DETAILED DESCRIPTION

Figure 1:
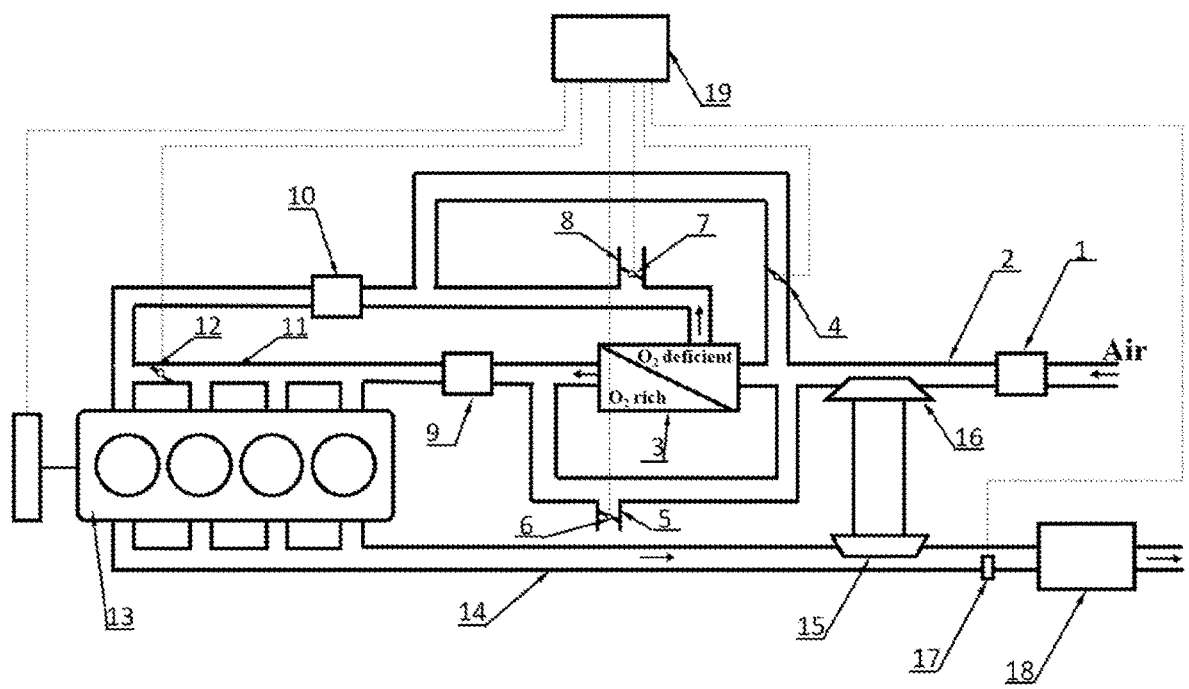
FIG. 1 is a structure diagram of the intake oxygen concentration control system suitable for an engine with lean $NO_x$ trapping technology according to the present disclosure.
Figure 2:
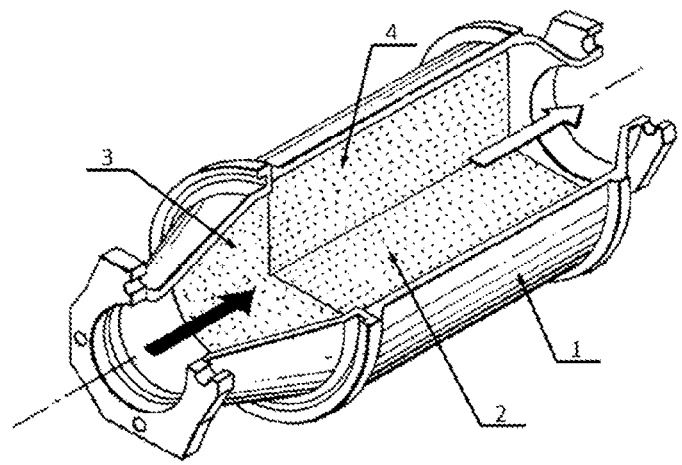
FIG. 2 is a structure diagram of the lean $NO_x$ trapping device disclosed in Chinese patent No. CN201010562656.4 "System and Method for Reducing $NO_x$ Breakthrough".

The technical solutions in the embodiments of the present disclosure will be clearly and completely described below with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

The direction and position terms mentioned in the present disclosure, such as left, above, and below, only refer to directions or positions with reference to the drawings. Therefore, the direction and position terms are used to describe and understand the present disclosure, but not to limit the protection scope of the present disclosure.

As shown in the figures, the intake oxygen concentration control system suitable for an engine with lean $NO_x$ trapping technology provided in the present disclosure includes an exhaust turbocharging system, an intake system, a lean $NO_x$ trapping post-treatment system, and a control system.

The exhaust turbocharging system includes a turbine 15, and a revolving shaft of the turbine 15 is fixedly connected with a revolving shaft of a compressor 16 coaxially.

The intake system includes an air filter 1 installed on an intake pipe 2, where, an inlet of the air filter 1 communicates with the atmosphere, an intake pipe 2 at an exhaust side of the air filter 1 communicates with a gas inlet of the compressor 16, and a gas outlet of the compressor 16 communicates with inlets of three branches; an outlet of a first branch is connected to a gas inlet of an oxygen-enriched membrane 3, and after air passes through the oxygen-enriched membrane 3, oxygen-rich and oxygen-deficient gases are generated; an oxygen-rich gas outlet of the oxygen-enriched membrane 3 communicates with an oxygen-rich gas mixing chamber 9 via an oxygen-rich gas branch, and an outlet of the oxygen-rich gas mixing chamber 9 is connected to four cylinders via intake manifolds 11; a mixed gas flow control valve 12 is disposed on an intake manifold communicating with a first cylinder on the left;

an oxygen-deficient gas outlet of the oxygen-enriched membrane 3 is connected, via an oxygen-deficient gas branch, successively to an inlet of an oxygen-deficient gas exhaust pipe 8, an oxygen-deficient gas mixing chamber 10, and an intake manifold located at an outlet of the mixed gas flow control valve 12 and communicating with the first cylinder on the left; an oxygen-deficient gas flow control valve 7 is installed on the oxygen-deficient gas exhaust pipe 8;

a second branch is connected, along an air flow direction, successively to a first air flow control valve 4 and an oxygen-deficient branch located between an gas inlet of the oxygen-deficient gas exhaust pipe 8 and the oxygen-deficient gas mixing chamber 10; the air circulating in the second branch is mixed with the oxygen-deficient gas in the oxygen-deficient gas mixing chamber 10; a third branch is connected, along the air flow direction, successively to a gas inlet of an air exhaust pipe 5 and the oxygen-rich gas branch located between the oxygen-rich gas mixing chamber 9 and the oxygen-rich gas outlet of the oxygen-enriched membrane 3; a second air flow control valve 6 is installed on the air exhaust pipe 5; and the air circulating in the third branch is mixed with the oxygen-rich gas in the oxygen-rich gas mixing chamber 9.

The lean $NO_x$ trapping post-treatment system includes an oxygen sensor 17 and a lean $NO_x$ trapping device 18 that are successively arranged on an engine exhaust pipe 14 along a cylinder exhaust direction; and a gas inlet of the turbine 15 communicates with an engine exhaust pipe 14, and a gas exhaust of the turbine 15 communicates with the lean $NO_x$ trapping post-treatment system. After passing through the turbine 15, exhaust enters the lean $NO_x$ trapping device 18 through the oxygen sensor 17, where, $NO_x$ is reduced to $N_2$ and then emitted into the atmosphere. The lean $NO_x$ trapping device 18 may adopt an existing structure, such as the structure consisting of a housing 1, a core 2, a carrier coating 3 and a catalyst 4 disclosed in Chinese patent No. CN201010562656.4 "System and Method for Reducing $NO_x$ Breakthrough".

The control system includes an ECU 19 that is connected to the engine, the first air flow control valve 4, the second air flow control valve 6, the oxygen-deficient gas flow control valve 7, the mixed gas flow control valve 12, and the oxygen sensor 17 via control lines, separately; and the ECU 19 generates opening signals for each flow control valve according to the engine operating condition signals and oxygen concentration signals from the oxygen sensor 17.

In a lean combustion cycle (oxidation atmosphere) required by the lean $NO_x$ trapping device 18, the oxygen-deficient gas flow control valve 7 is fully opened; the mixed gas flow control valve 12 in the intake manifold of the first cylinder on the left is fully opened; the air flow control valve 4 of the second branch for mixing with the oxygen-deficient gas is closed; and the ECU 19 determines the required oxygen concentration in the cylinder according to the engine operating condition signal and generates the opening signal for the second air flow control valve 6 of the third branch communicating with the oxygen-rich gas, thereby providing an intake gas with a suitable oxygen concentration for the four cylinders.

In a rich combustion cycle (reducing atmosphere) required by the lean $NO_x$ trapping device 18, the mixed gas flow control valve 12 is closed; and the ECU 19 calculates the oxygen concentration required by the first cylinder on the left and the remaining three cylinders according to the engine operating condition signal and the oxygen concentration signal in exhaust, and generates the opening signal for each flow control valve, so that oxygen-deficient combustion (i.e., rich combustion) is conducted in the first cylinder on the left, and the fuel in the remaining three cylinders is combusted with air or an oxygen-rich gas with a low oxygen concentration.

What is claimed is:

1. An intake oxygen concentration control system suitable for an engine with lean $NO_x$ trapping technology, comprising: an exhaust turbocharging system, an intake system, a lean $NO_x$ trapping post-treatment system, and a control system; wherein, the exhaust turbocharging system comprises a turbine, and a revolving shaft of the turbine is fixedly connected with a revolving shaft of a compressor coaxially;

the intake system comprises an air filter installed on an intake pipe, wherein, an inlet of the air filter communicates with the atmosphere, an intake pipe at an exhaust side of the air filter communicates with a gas inlet of the compressor, and a gas outlet of the compressor communicates with inlets of three branches; an outlet of a first branch is connected to a gas inlet of an oxygen-enriched membrane, and after air passes through the oxygen-enriched membrane, oxygen-rich and oxygen-deficient gases are generated; an oxygen-rich gas outlet of the oxygen-enriched membrane communicates with an oxygen-rich gas mixing chamber via an oxygen-rich gas branch, and an outlet of the oxygen-rich gas mixing chamber is connected to four cylinders via intake manifolds; a mixed gas flow control valve is disposed on an intake manifold communicating with a first cylinder on the left;

an oxygen-deficient gas outlet of the oxygen-enriched membrane is connected, via an oxygen-deficient gas branch, successively to an inlet of an oxygen-deficient gas exhaust pipe, an oxygen-deficient gas mixing chamber, and an intake manifold located at an outlet of the mixed gas flow control valve and communicating with the first cylinder on the left; an oxygen-deficient gas flow control valve is installed on the oxygen-deficient gas exhaust pipe;

a second branch is connected, along an air flow direction, successively to a first air flow control valve and an oxygen-deficient branch located between an gas inlet of the oxygen-deficient gas exhaust pipe and the oxygen-deficient gas mixing chamber; the air circulating in the second branch is mixed with the oxygen-deficient gas in the oxygen-deficient gas mixing chamber; a third branch is connected, along the air flow direction, successively to a gas inlet of an air exhaust pipe and the oxygen-rich gas branch located between the oxygen-rich gas mixing chamber and the oxygen-rich gas outlet of the oxygen-enriched membrane; a second air flow control valve is installed on the air exhaust pipe; and the air circulating in the third branch is mixed with the oxygen-rich gas in the oxygen-rich gas mixing chamber;

the lean $NO_x$ trapping post-treatment system comprises an oxygen sensor and a lean $NO_x$ trapping device that are successively arranged on an engine exhaust pipe along a cylinder exhaust direction; and a gas inlet of the turbine communicates with an engine exhaust pipe, and a gas exhaust of the turbine communicates with the $NO_x$ trapping device; and the control system comprises an electronic control unit (ECU) that is connected to the engine, the first air flow control valve, the second air flow control valve, the oxygen-deficient gas flow control valve, the mixed gas flow control valve, and the oxygen sensor via control lines, separately; and the ECU generates opening signals for each flow control valve according to the engine operating condition signals and oxygen concentration signals from the oxygen sensor.

\* \* \* \* \*